United States Patent
Smolinske et al.

(10) Patent No.: US 10,744,688 B2
(45) Date of Patent: Aug. 18, 2020

(54) LIGHTWEIGHT MATERIAL

(71) Applicant: 4M Company, Seattle, WA (US)

(72) Inventors: Stephen B. Smolinske, Seattle, WA (US); Rodger Clement, Seattle, WA (US); Jim Sears, Seattle, WA (US); Vern Meyers, Seattle, WA (US)

(73) Assignee: 4M Company, Seattle, WA (US)

( * ) Notice: Subject to any disclaimer, the term of this patent is extended or adjusted under 35 U.S.C. 154(b) by 88 days.

(21) Appl. No.: 15/918,476

(22) Filed: Mar. 12, 2018

(65) Prior Publication Data

US 2018/0200929 A1    Jul. 19, 2018

Related U.S. Application Data

(63) Continuation of application No. 15/178,093, filed on Jun. 9, 2016, now Pat. No. 9,925,702, which is a continuation of application No. 13/365,102, filed on Feb. 2, 2012, now Pat. No. 9,371,129.

(60) Provisional application No. 61/439,048, filed on Feb. 3, 2011.

(51) Int. Cl.
| | |
|---|---|
| *B29C 45/00* | (2006.01) |
| *B64C 1/14* | (2006.01) |
| *B29B 11/16* | (2006.01) |
| *B29C 45/72* | (2006.01) |
| *F16J 15/02* | (2006.01) |
| *B29K 83/00* | (2006.01) |
| *B29K 105/16* | (2006.01) |
| *B29K 509/08* | (2006.01) |
| *B29L 31/26* | (2006.01) |

(52) U.S. Cl.
CPC .......... *B29C 45/0001* (2013.01); *B29B 11/16* (2013.01); *B29C 45/72* (2013.01); *B64C 1/14* (2013.01); *B64C 1/1492* (2013.01); *F16J 15/025* (2013.01); *B29K 2083/00* (2013.01); *B29K 2105/16* (2013.01); *B29K 2509/08* (2013.01); *B29K 2995/0046* (2013.01); *B29L 2031/26* (2013.01)

(58) Field of Classification Search
CPC ...... C08L 83/04; B29C 45/0001; B29C 45/72
See application file for complete search history.

(56) References Cited

U.S. PATENT DOCUMENTS

| | | | |
|---|---|---|---|
| 3,575,427 A | 4/1971 | Lapac et al. | |
| 3,986,213 A | 10/1976 | Lynch | |
| 4,060,032 A | 11/1977 | Evans | |
| 4,060,435 A | 11/1977 | Schroeder | |
| 4,094,054 A | 6/1978 | Fischer | |
| 4,144,372 A | 3/1979 | Beck | |
| 4,485,192 A | 11/1984 | Gibbs et al. | |
| 4,506,793 A * | 3/1985 | MacGregor | A61J 1/065 215/49 |
| 4,580,794 A * | 4/1986 | Gibbons | C08K 7/18 156/329 |
| 4,744,601 A | 5/1988 | Nakanish | |
| 4,900,629 A | 2/1990 | Pitolaj | |
| 5,162,397 A | 11/1992 | Descamps et al. | |
| 5,202,362 A | 4/1993 | Hermele | |
| 5,251,414 A | 10/1993 | Duke | |
| 5,359,735 A | 11/1994 | Stockwell | |
| 5,400,296 A | 3/1995 | Cushman et al. | |
| 5,429,046 A | 7/1995 | Shiba et al. | |
| 5,549,908 A | 8/1996 | Smith | |
| 5,702,111 A | 12/1997 | Smith | |
| 5,738,812 A | 4/1998 | Wild | |
| 5,762,438 A | 6/1998 | Reed | |
| 5,816,236 A | 10/1998 | Moroi et al. | |
| 5,910,524 A | 6/1999 | Kalinoski | |
| 5,945,036 A | 8/1999 | Reitz | |
| 5,981,610 A | 11/1999 | Meguriya et al. | |
| 6,056,527 A | 5/2000 | Bunyan et al. | |
| 6,127,457 A | 10/2000 | Darling | |
| 6,194,476 B1 | 2/2001 | De Ridder et al. | |
| 6,261,214 B1 * | 7/2001 | Meguriya | C08K 7/24 492/46 |
| 6,284,809 B1 | 9/2001 | Plummer et al. | |
| 6,303,180 B1 | 10/2001 | Bunyan et al. | |
| 6,328,765 B1 | 12/2001 | Hardwick et al. | |
| 6,409,764 B1 | 6/2002 | White et al. | |
| 6,443,986 B1 | 9/2002 | Malice, Jr. et al. | |
| 6,451,374 B1 | 9/2002 | Watchko et al. | |
| 6,540,427 B2 | 4/2003 | Scheidling et al. | |
| 6,602,102 B2 | 8/2003 | Gines et al. | |

(Continued)

OTHER PUBLICATIONS

Dave Demeijian, Airlines Try to Lighten Up—Literally www.wired. com/autopia/2008/04/airlines-try-to/.

(Continued)

*Primary Examiner* — Kuo Liang Peng
(74) *Attorney, Agent, or Firm* — Schacht Law Office, Inc.; Dwayne Rogge

(57) ABSTRACT

Disclosed herein is a novel approach to producing a lightweight component. The lightweight component is produced of a much lighter material than has been used before, produced by a process of mixing a compound containing uncured silicone and a volume of microspheres, and then dispensing this material into a mold. Such a mold may be a female mold having the negative three dimensional shape of the lightweight component to be produced. The lightweight component may then be pressurized and/or heated during the curing process either prior to removing the lightweight component from the mold or after removing the lightweight component from the mold.

5 Claims, 1 Drawing Sheet

(56) References Cited

U.S. PATENT DOCUMENTS

| | | | |
|---|---|---|---|
| 6,623,864 | B1 | 9/2003 | Sweet et al. |
| 6,635,354 | B2 | 10/2003 | bunyan et al. |
| 6,736,352 | B2 | 5/2004 | Bladt et al. |
| 7,101,607 | B2 | 9/2006 | Mollendorf et al. |
| 7,552,896 | B2 | 6/2009 | Coak |
| 9,371,129 | B1 | 6/2016 | Smolinske et al. |
| 9,925,702 | B2 | 3/2018 | Smolinske et al. |
| 2004/0132890 | A1 | 7/2004 | Oka et al. |
| 2007/0069080 | A1 | 3/2007 | Rassaian et al. |
| 2007/0267131 | A1 | 11/2007 | Reitmeter et al. |
| 2008/0318011 | A1 | 12/2008 | Chaussade et al. |
| 2010/0163676 | A1 | 7/2010 | Burgunder et al. |
| 2012/0133079 | A1 | 5/2012 | Sykes et al. |
| 2016/0288382 | A1 | 10/2016 | Smolinske et al. |
| 2017/0158821 | A1* | 6/2017 | Todoroki ................ C08L 83/04 |

OTHER PUBLICATIONS

Dr. Pietro Cervellera, Altair HyperWorks in Action, Webinar Series, Reducing Weight in Aircraft Structures, Nov. 27, 2007, 2:00-2:40pm ET.

Federal Aviation Administration, Aircraft Weight and Balance Handbook, FAA-H-8083-1A.

Freeman (Silicones, Published for the Plastics Institute, Iliffe Books Ltd., 1962, p. 27).

OverMolding (http://www.acomold.com/what-is-overmolding.html) (date unknown).

SiliconeOil (http://www.dowcorning.com/content/discover/discoverchem/si-rheology.aspx- ) (date unknown).

\* cited by examiner

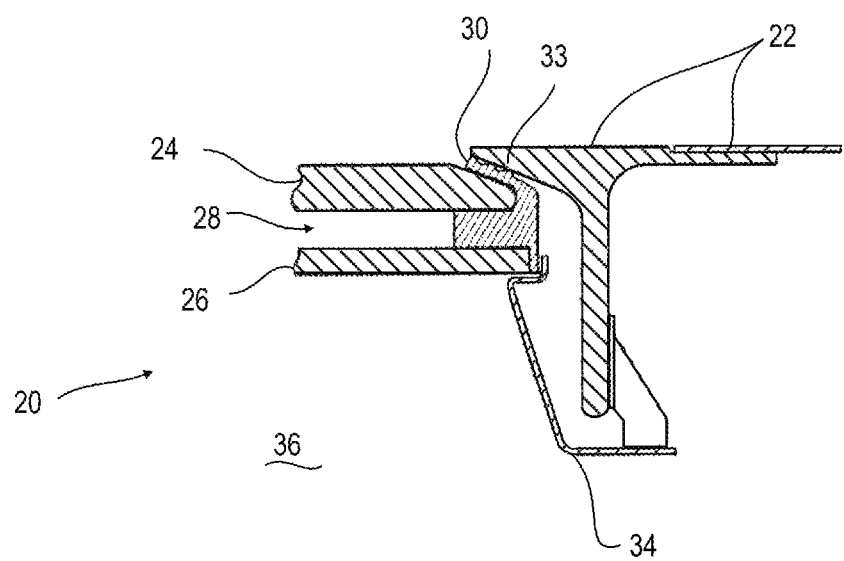

LIGHTWEIGHT MATERIAL

RELATED APPLICATIONS

This application is a continuation of U.S. patent Ser. No. 15/178,093 filed on Jun. 9, 2016. U.S. patent Ser. No. 15/178,093 claims priority benefit of U.S. patent Ser. No. 13/365,102 filed on Feb. 2, 2012 incorporated herein by reference. U.S. Ser. No. 13/365,102 claims priority benefit of U.S. Ser. No. 61/439,048, filed Feb. 3, 2011, incorporated herein by reference.

BACKGROUND OF THE DISCLOSURE

Field of the Disclosure

This application relates to the field of lightweight materials formed of a volume of silicone and a volume of microspheres.

Background Art

Malleable seals for aircraft have been in use since aircraft first used windows. Such seals are similar in some respects to the malleable seals found in homes, automobiles, boats, and elsewhere. Generally, such seals form a weather-tight malleable separation between the outer hull (frame and skin) of the aircraft and the window(s). Such seals are utilized so that the interior of the cabin stays warm, dry, and in modern aircraft, pressurized. Such seals must remain useable in the presence of very high pressures differentials between the interior and exterior of aircraft that fly at high altitudes. Such pressures are utilized to supply sufficient oxygen (and heat) to passengers and crew.

SUMMARY OF THE DISCLOSURE

Disclosed herein is one example of a lightweight aircraft window seal or other lightweight component made by the steps comprising: providing a volume of viscoelastic fluid silicone; providing a volume of microspheres; combining the fluid silicone with the microspheres to produce a lightweight fluid. The lightweight fluid is then disposed into a female mold having the negative three dimensional shape of the lightweight component. The lightweight component is then allowed to cure. The lightweight component is removed from the mold, either before or after the curing process is complete.

To promote a better seal in one example, the process for forming the lightweight component as recited above may further comprise the step of applying heat and/or pressure to the lightweight component during the curing process. This step of applying heat to the lightweight component may be enacted during the curing process prior to removing the lightweight component from the mold.

While the lightweight component as recited above may utilize several different microspheres, in one embodiment the microspheres are air filled glass spheres. These air filled glass spheres in one embodiment may be formed of silica quartz, although other materials may also be utilized.

A method for making a lightweight component is also disclosed, substantially following the steps described above.

BRIEF DESCRIPTION OF THE DRAWINGS

FIG. 1 is a highly schematic view of an aircraft window seal in cross section, produced by one example of the invention.

DESCRIPTION OF THE PREFERRED EMBODIMENTS

FIG. 1 shows a highly schematic view of a modern aircraft window assembly 20 in cross section. The aircraft skin and frame are shown at 22 with an outer transparent window pane 24 and inner transparent window pane 26 separated by an airspace 28. The use of double panes is a structure which improves thermal and acoustic insulation of the assembly. Some applications allow for air to be evacuated from the airspace 28 to reduce condensation, improve thermal and acoustic insulation, and improve visual transmission through the window assembly.

As fuel costs rise, aircraft manufacturers and airlines are looking to reduce the weight of an aircraft and load in any way possible. Airlines have for example removed magazine racks, redesigned food and beverage carts, used lighter frame materials such as carbon fiber over the much heavier traditional aluminum, reduced the allowed baggage each passenger is allowed to bring without additional cost to them, etc.

As the limits of weight reduction infringe on safety issues, reducing the weight of the aircraft and load becomes exponentially more difficult.

Reduction of the overall weight of an aircraft and load (including passengers, crew, baggage, freight, etc.) has been a priority for aircraft designers, manufacturers, and airlines for some time. The limits of such weight reduction however have a limit. As superfluous items are removed or their weight reduced, removal or weight reduction of the remaining items may not be practical. As the lightest known materials and composites are then used for the remaining items such as windows, frames, seats, etc. additional weight reduction becomes much more difficult.

In this endeavor to lighten the aircraft or other components without sacrificing structural integrity, the malleable seals used to seal the windows and doors to the frame and/or skin of the aircraft were examined to determine if there is a potential to reduce the weight thereof without sacrificing structural integrity of the seal or surrounding structure. While to a lay observer this may not seem to have a significant impact on the weight of the aircraft, it should be noted that modern aircraft may have 200 passenger windows or more. In addition, many aircraft manufacturers and their customers are looking at ways to make aircraft windows larger to increase outside visibility and reduce the amount of power required for interior lighting. In addition, the door seals, hatch seals, windshield seals, and other components may also be lightened. In one example this is accomplished by converting the material used in such components from the rubber, silicone, or other relatively heavy materials currently in use to the disclosed material, decreasing the overall weight of the aircraft.

While the term "window seals" is used herein for brevity, the disclosed material may also be used in malleable door seals, hatch seals, and other equivalent components which are positioned between separate rigid structures on aircraft or elsewhere.

Disclosed herein is a novel approach to producing an aircraft window seal, or other component produced of a much lighter material than has been used before. The aircraft window seal is produced by mixing a compound containing uncured silicone and a volume of microspheres, and then dispensing this material into a mold. Such a mold may be a female mold having the negative three dimensional shape of the aircraft seal or other component to be produced. The component may then be pressurized and/or heated during the curing process either prior to removing the component from the mold, or after removing the seal from the mold.

This approach is effective as the microspheres are less dense than the silicone or rubber traditionally used, thus the weight of the composition is significantly reduced. Microspheres by themselves are not effective as seals for many reasons including their lack of malleability, airflow around adjacent microspheres, and potentially airflow through individual microspheres. In addition, while a significant percentage of the material may be made of microspheres in order to establish a weight loss of the final composition, a delicate balance must be achieved in each application between the volume of silicone, and the volume of microspheres. Using too high a percentage volume of microspheres may result in a poor material due to lack of malleability, and possibly airflow through the material. As aircraft windows tend to deflect outward as the aircraft is pressurized from within, especially at cruising altitudes, malleability is especially important to maintain integrity of the seal. It is also suspected that a high percentage of microspheres may adversely affect the migration of the seal relative to the window and/or aircraft frame/skin.

The term "microspheres" is a term well known in the art. In one example, microspheres may be 1 µm to 1000 µm (1 mm) in diameter. Such microspheres are commonly made of glass (quartz) or other ceramics. The spheres are commonly hollow and air-filled, but may be filled with other gasses and may not be sealed (open cell) hollow spheres. Microspheres are also commonly polyethylene and polystyrene.

Such a seal for aircraft as recited above is particularly well suited for any commercial or military aircraft where weight savings are desirable in order to increase fuel efficiency.

The disclosed lightweight viscoelastic fluid has been produced and tested by combining a volume of fluid silicone with a volume of micro spheres. The test results of a gasket made from this material are shown below:

|  |  | Test method | Results |
|---|---|---|---|
| Durometer | Points | ATSM D 2240 | 55 |
| Tensile Strength | PSI, Min | ATSM D 412 | 682 |
| Elongation | % Min | ATSM D 412 | 520 |
| Tear Resistance | PPI, Min | ATSM D 624 | 80 |
| Specific Gravity | Points | ATSM D 297 | 1.00 |

The seal or other component comprises a viscoelastic compound made from a formulated compound containing viscoelastic fluid silicone and micro spheres.

Viscoelasticity is the property of materials that exhibit both viscous and elastic characteristics when undergoing deformation. Viscous materials, like honey, resist shear flow and strain linearly with time when a stress is applied.

The uncured viscoelastic compound may be injected, poured, or placed by hand in the mold. The mold is then closed and compound is allowed to cure for a time whereupon the mold is opened and the finished part (seal) is removed. In some applications, the uncured compound may be subjected to heat and or pressure to effect physical and/or chemical changes in the material. For example, the uncured compound may be injected into the mold, whereupon the mold and material are subjected to increased pressures and increased temperatures during at least part of the curing process.

It may also be desired to increase production output, to remove the partially cured component from the mold. The partially cured seal may be subjected to heat, pressure, or may just be allowed to cure over time outside of the mold. As long as the uncured seal holds the desired shape until completely cured, it may not be detrimental to remove the component from the mold prior to final curing.

The seal may then be installed into an aircraft to hold windows in place and seal the gap between the window and the aircraft frame or skin.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

We claim:

1. A method for making a lightweight component comprising the steps of:
   providing a volume of viscoelastic silicone which exhibits both viscous and elastic characteristics when molded;
   providing a volume of microspheres;
   combining the viscoelastic silicone with the microspheres to produce a lightweight viscoelastic compound;
   disposing the lightweight viscoelastic compound into a mold having a three-dimensional shape of the lightweight component;
   following the step of disposing the lightweight viscoelastic compound into a mold, subjecting the lightweight viscoelastic compound to increased pressure and heat over time to cure, thus forming the lightweight component;
   removing the lightweight component from the mold as a partially cured lightweight component; and
   wherein the step of subjecting the viscoelastic compound to increased pressure and heat over time to cure follows the step of removing the partially cured lightweight component from the mold.

2. The method for making the lightweight component as recited in claim 1 wherein the microspheres are air-filled glass spheres.

3. The method for making the lightweight component as recited in claim 2 wherein the air-filled glass spheres comprise silica quartz.

4. The method for making the lightweight component as recited in claim 1 wherein the step of disposing the lightweight viscoelastic compound into a mold is accomplished by pressure injection molding.

5. The method for making the lightweight component made by the process as recited in claim 1 wherein the lightweight component is selected from the group consisting of: window seals, door seals, hatch seals, and windshield seals.

* * * * *